United States Patent
Jung et al.

(10) Patent No.: US 6,675,300 B1
(45) Date of Patent: Jan. 6, 2004

(54) REMOTE CONTROLLED COMPUTER SYSTEM AND MANAGEMENT METHOD HAVING AN IDENTIFICATION NUMBER

(75) Inventors: Hee-Duck Jung, Kyunggi-do (KR); Hong-Sam Kim, Yongin-shi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/524,279

(22) Filed: Mar. 13, 2000

(30) Foreign Application Priority Data

Mar. 12, 1999 (KR) .......................................... 1999-08391

(51) Int. Cl.[7] .............................................. H04L 9/32
(52) U.S. Cl. .......................... 713/200; 700/17; 700/83; 713/202; 713/182
(58) Field of Search .............................. 700/11, 17, 237, 700/83, 2, 3, 244; 713/200–202, 182–185; 340/5.64, 5.74, 825.69, 825.72, 5, 64

(56) References Cited

U.S. PATENT DOCUMENTS

| | | | |
|---|---|---|---|
| 3,890,601 A | | 6/1975 | Pietrolewicz .............. 711/164 |
| 4,800,590 A | | 1/1989 | Vaughan .................... 713/184 |
| 4,959,860 A | | 9/1990 | Watters et al. ............. 713/202 |
| 5,241,594 A | * | 8/1993 | Kung ......................... 713/151 |
| 5,402,492 A | * | 3/1995 | Goodman et al. .......... 713/202 |
| 5,856,789 A | * | 1/1999 | Huang ....................... 713/300 |
| 5,942,985 A | * | 8/1999 | Chin .......................... 340/5.61 |
| 5,960,085 A | * | 9/1999 | de la Huerga ............. 340/5.61 |
| 5,987,612 A | * | 11/1999 | Takagawa et al. ......... 713/201 |
| 6,041,413 A | * | 3/2000 | Wang ......................... 713/202 |
| 6,101,608 A | * | 8/2000 | Schmidt et al. ............ 713/202 |
| 6,108,591 A | * | 8/2000 | Segal et al. ..................... 701/1 |
| 6,121,962 A | * | 9/2000 | Hwang ....................... 345/211 |
| 6,216,230 B1 | * | 4/2001 | Rallis et al. ................ 713/185 |
| 6,282,451 B1 | * | 8/2001 | White ........................... 700/22 |
| 6,366,957 B1 | * | 4/2002 | Na ............................... 709/229 |
| 6,381,700 B1 | * | 4/2002 | Yoshida ..................... 713/201 |
| 6,397,337 B1 | * | 5/2002 | Garrett et al. ............. 713/202 |

FOREIGN PATENT DOCUMENTS

| | | | | |
|---|---|---|---|---|
| JP | 63286950 A | * | 11/1988 | ............ G06F/15/00 |
| JP | 06078367 A | * | 3/1994 | ............ H04Q/9/00 |
| JP | 10253129 A | * | 9/1998 | ............ F24F/11/02 |
| JP | 2000259566 A | * | 9/2000 | ............ G06F/15/00 |

OTHER PUBLICATIONS

*Platform Components Databook*, Intel Corporation, 1/98, cover page, support services page and pp. 221–227.

* cited by examiner

*Primary Examiner*—Anil Khatri
*Assistant Examiner*—Crystal J. Barnes
(74) *Attorney, Agent, or Firm*—Robert E. Bushnell, Esq.

(57) ABSTRACT

A computer system having a remote controller storing an identification number includes a remote controller generating a remote control signal for performing remote control of the computer system and a remote control signal receiver receiving a remote control signal from the remote controller. An identification number is stored in the remote control signal receiver and the remote controller, respectively. When the two identification numbers are identical to each other, remote control of the computer system in response to the remote control signal from the remote controller is then performed. According to a power state of the computer system, the remote control signal causes remote control corresponding to an appointed key of the remote controller to be performed. The identification number of the computer system is provided for a security function of the computer system, and a user can set it to be identical to that of the remote controller. When the remote controller is lost, a user can set a new identification number with the use of a new remote controller, performing remote control of computer system operation. Further, database management of the identification numbers leads to a determination as to whether a user is authorized, managing history of the computer system and preventing a robbery of the computer system.

24 Claims, 11 Drawing Sheets

REMOTE CONTROLLED COMPUTER SYSTEM AND MANAGEMENT METHOD HAVING AN IDENTIFICATION NUMBER

CLAIM OF PRIORITY

This application makes reference to, incorporates the same herein, and claims all benefits accruing under 35 U.S.C. §119 arising from an application for a REMOTE CONTROLLED COMPUTER SYSTEM HAVING IDENTIFICATION NUMBER AND MANAGEMENT METHOD OF THE SAME earlier filed in the Korean Industrial Property Office on Mar. 12, 1999 and there duly assigned Serial No. 8391/1999.

FIELD OF THE INVENTION

The present invention relates to a computer system and, more particularly, to a computer system having a security function.

BACKGROUND OF THE INVENTION

U.S. Pat. No. 4,959,860 to Jeffrey S. Watters et al., entitled Power-on Password Functions for Computer System, discloses a RAM (random access memory) receiving power from a battery that maintains the password when system power is turned off. However, Watters et al. '860 does not refer to a security function of a computer operated by a remote controller. A power-on password security function is disclosed in Watters et al. '860 for a digital computer system that allows the system software to distinguish between authorized users. Safeguards are made against corruption of password data which could lead to lock-out of authorized users, and redundant checks allow the security function to operate even when first-level checks fail. It is disclosed that a battery-powered RAM storage area used to hold the password when the system is turned "off" is protected against being accessible by unauthorized users when the system turned "on".

U.S. Pat. No. 4,800,590 to Vaughan, entitled Computer Key And Computer Lock System, discloses a computer access system that includes a password generator and a lock computer connected to receive passwords generated by the password generator and grant access to a host computer when a password from the password generator matches a password separately generated by the lock computer. It is disclosed that the password generator and the lock computer have corresponding pseudo-random number sequences stored in memories. The password generator and the lock computer have synchronized clocks, which define time intervals. It is disclosed that, during a given time interval, entry of a personal identification number in the password generator will cause the password generator to generate a unique password from the random number sequence in memory and time interval information from a clock. It is disclosed that the user transmits the so-generated password to the lock computer, which independently generates a comparison password from the corresponding pseudo-random number sequence stored in memory, and the time interval defined by the clock. If the passwords match, access to the computer is granted by the lock computer. It is disclosed that, since the valid passwords change with each time interval, subsequent use of an intercepted password will not grant access to the computer.

U.S. Pat. No. 3,890,601 to Pietrolewicz, entitled Password Operated System For Preventing Unauthorized Or Accidental Computer Memory Alteration, discloses that manipulation of a digital computer magnetic memory is locked out to prevent unauthorized or accidental erasure. The memory is provided with a unique password. It is disclosed that, unless the correct password is present in the computer, or entered into the computer by the operator, the computer will not run and the memory cannot be altered.

For the remote control of a computer system having a security function for information, it is necessary to consider a security function, such as a notch, that confirms a complementary metal oxide semiconductor (CMOS) password provided from the system. Without the consideration thereof, a user has to personally input a password in the notch when the remote controller boots the computer system. The remote control of the computer system is disadvantageous in that the user has to personally input the password required in the security function.

A remoter controller has commonly been used to control operation of various electric products such as a television (TV), an audio player system, and a video player system. In general, one remote controller is used in only one electric product while remote controllers used in the same products have the same data transmission frequency and data code. If all of the products are of the same kind, any remote controller can operate the products. The remote controller applied to a computer system leads to the same result. This means that an unauthorized user, who has the same kind of remote controller, can remotely control the computer system. In order to secure a computer system, it is necessary to provide an apparatus which differentiates between respective users of the same kind of computer systems and a method of accomplishing the same.

As a result, there is a requirement for a remote controller which can remotely operate a computer system having an existing security function and recognize respective systems to be different despite the fact that they are the same kind of systems, and a computer system having the remote controller. Moreover, an apparatus having such a remote control and a secure function, and the method of implementing the same, are required when such a remote controller having the above function is lost.

SUMMARY OF THE INVENTION

It is, therefore, an object of the invention to provide a remote control computer system capable of remotely operating a computer system having an existing security function.

It is another object of the invention to provide a remote controller having an identification number and a remote control computer system having the remote controller so as to recognize respective systems to be different despite the fact that they are the same kind of systems.

It is a further object of the invention to provide a method of setting and managing an identification number so as to perform a remote control function and a security function of a computer system, even when a remote controller having the identification number is lost.

According to one feature of the invention, a computer system includes: a computer; a remote controller storing an identification number and generating a remote control signal, including a command code, for remote control of the identification number and the computer system; a remote control signal receiver connected to the computer and receiving a remote control signal from the remote controller, wherein the same identification number as an identification number of the remote controller is stored in the remote control signal receiver; and program performing means for performing an automatic log on of an operating system, and for automatically performing an appointed program according to the remote control signal of the remote controller when the identification number of the remote controller is identical to that of the remote control signal receiver.

A remote controller for use in the present invention includes: a first memory storing an identification number; a first command key for inputting a command to automatically execute an operating system; a second command key for inputting a command to automatically execute a first program after automatic log on of the operating system; a third command key for inputting a command to automatically execute a second program after automatic log on of the operating system; a first microcontroller generating a remote control signal, including a command code, corresponding to a selected one of the first to third command keys; a remote control signal transmission circuit using one of an infrared signal and a radio frequency (RF) signal in order to transmit the remote control signal to the remote control signal receiver of the computer system; and a power supply for supplying operational power for the remote controller.

A remote control signal receiver for use in the present invention includes: a second memory for storing an identification number; a remote control signal receiving circuit for receiving a remote control signal from the remote controller by using one of an infrared signal and a radio frequency (RF) signal; and a second microcontroller for receiving the remote control signal and a power state signal of the computer, and for determining whether the identification number included in the received remote control signal is identical to the identification number stored in the second memory. At this time, the second microcontroller inputs the command code by the program execution means when the identification number included in the remote control signal from the remote controller is identical to the identification number stored in the second memory.

In the present invention, a power state of the computer system is one of a system off state, a normal state, and a stand-by state. Also, the function corresponding to the remote control signal is executed according to the power state of the computer system, and typically does not include a power turn-off function in order to prevent data loss caused by shutdown of the operation when the remote controller is mistakenly provided with an input.

In the present invention, if the identification number from the remote controller is identical to the identification number of the second memory when the computer system is booted by means of the remote controller, a set complementary metal oxide semiconductor (CMOS) password check is automatically skipped.

A program execution means of the present invention includes: a virtual keyboard driver for confirming whether the command code transmitted from the remote control signal receiver is input, and then generating a control command; means for responding to the control command and then automatically executing a program; and means for performing an automatic log on of an operating system by automatically inputting the user identification number and the password to the operating system when the computer system is booted by a remote controller having an identification number the same as the identification number of the remote control signal receiver.

In the present invention, the program execution means resides in the computer and is displayed in the shape of a tray icon and stores the identification number included in the remote control signal in the remote control signal receiver. The first and the second programs appointed by the second and the third command keys are variable. The program driving means or program execution means resides in the computer and is displayed in the shape of a tray icon for redefining the programs appointed by the second or the third command buttons of the remote controller. The icon for the program execution means is located in a taskbar as an indicator. When the icon is double-clicked, for example, assigned programs can be changed by a user.

According to another feature of the present invention, a method of storing an identification number, stored in a memory of a remote controller, in a memory of a remote control signal receiver includes the steps of: executing an identification number recognition mode; determining whether a remote control signal is received from the remote controller; analyzing the identification number of the remote controller included in the received remote control signal; determining whether an existing identification number is stored in the memory of the remote control signal receiver; and deleting the existing identification number, and then storing the identification number therein, if the existing identification number is stored therein, and storing the identification number therein, if the existing identification number is not stored therein.

In the present invention, the identification number of the remote controller is created so as to be stored in the remote controller when the remote controller is manufactured, or is created therein at random. Also, in the present invention, the identification number thereof is varied with different shapes or configurations so as to be stored in a plurality of addresses of the memory of the remote control signal receiver.

According to another feature of the invention, a method for remote control of the computer system in response to a remote control signal from a remote controller includes the steps of: checking a state of a remote control signal receiver, and then determining whether the remote control signal is input from a remote controller; determining whether an identification number included in the received remote control signal is identical to an identification number stored in the remote control signal receiver if the signal is input therefrom, and performing no operation until the signal is input therefrom if the signal is not input therefrom; and performing a function corresponding to the received remote control signal according to a power state of the computer system if the two identification numbers are identical to each other. At this time, the power state thereof is one of a system off state, a normal state, and a stand-by state.

In the present invention, the remote control signal includes: a first command generated by a first command key of the remote controller in order to perform an automatic log on of an operating system; a second command generated by a second command key of the remote controller in order to perform the automatic log on thereof and automatically execute a first program; and a third command generated by a third command key of the remote controller in order to perform the automatic log on thereof and automatically execute a second program. At this time, the method for remote control of the computer system in response to a remote control signal from a remote controller is performed according to the power state of the computer system, and does not include a power turn-off function in order to prevent data loss caused by shutdown of the operation when the remote controller mistakenly inputs information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DESCRIPTION OF THE PREFERRED EMBODIMENTS

A computer system having a remote controller of this invention includes a remote controller and a remote control signal receiver. The remote controller generates a remote control signal for remote control of the computer system, and the remote control signal receiver receives the remote control signal from the remote controller. An identification number is stored in each of the remote controller and the remote control signal receiver. When the two identification numbers are equal or match, the remote controller and the remote control signal receiver can perform a remote control operation which leads to automatic execution of an appointed program and a log on function to an operating system such as "windows" (hereafter referred to as "windows"). Particularly, the same identification number as that of a remote controller provided for the security function can be stored in the remote control signal receiver of the computer system. A manufacturing corporation can manage information of the identification numbers with a database. As a result, information of an authorized user using the computer system can be accurately managed to prevent robbery of the computer system.

Figure 1:
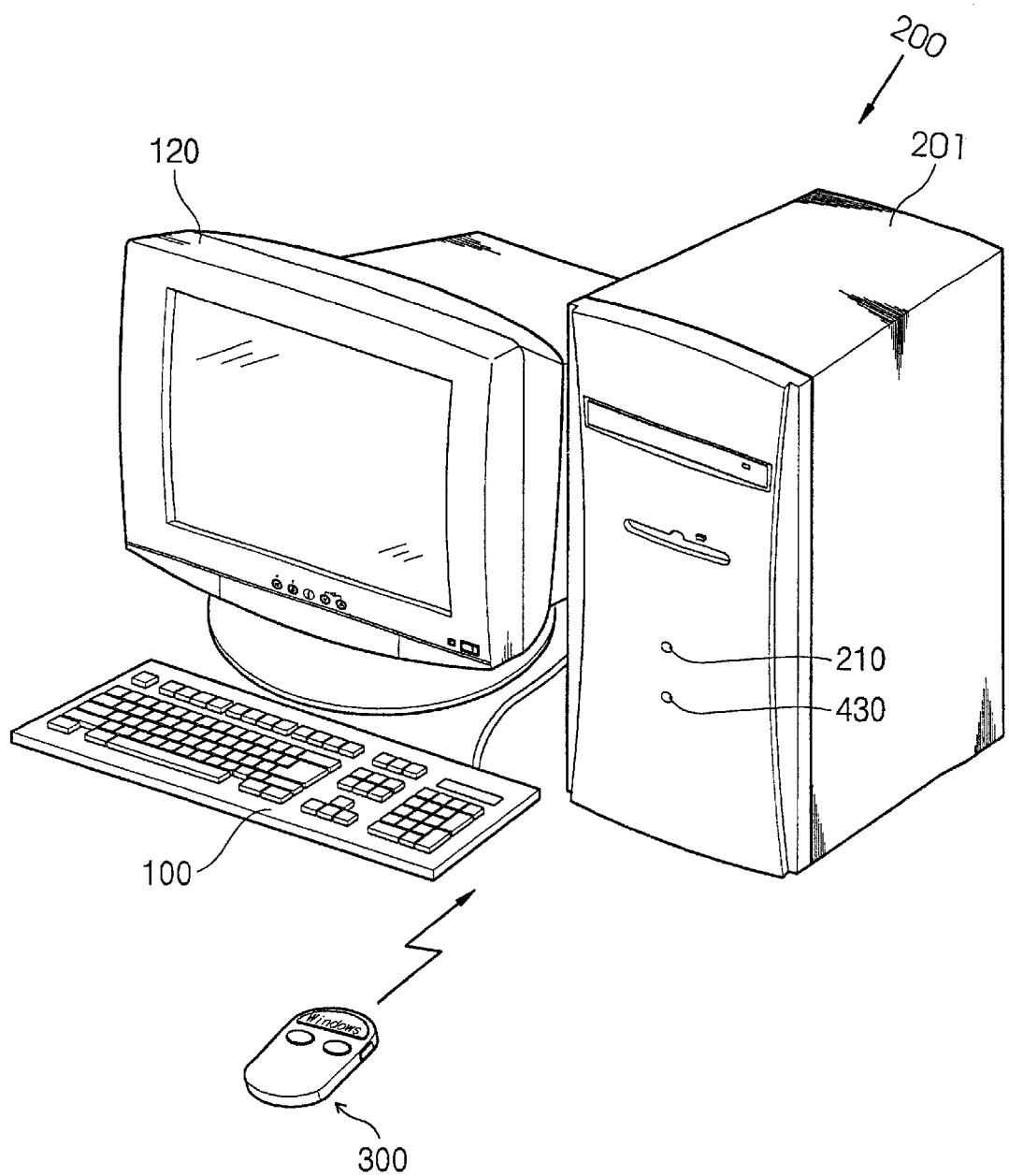
FIG. 1 is a perspective view illustrating a computer system having a remote controller according to the present invention.
Figure 2A:
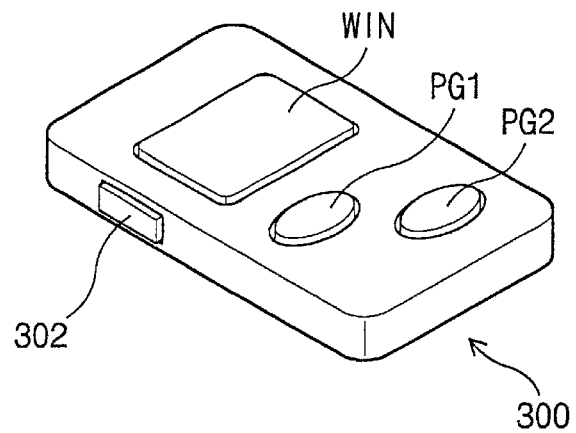
FIGS. 2A and 2B are diagrams illustrating remote controllers according to the present invention.
Figure 2B:
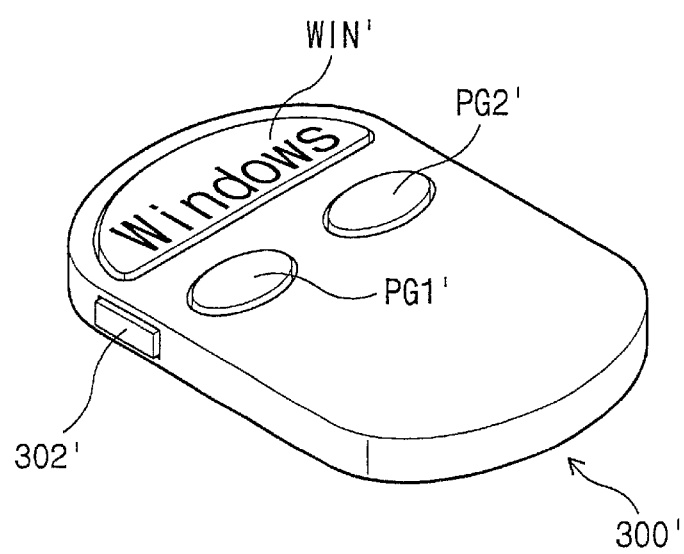

FIG. 1 illustrates a computer system having a remote controller according to the invention, and FIGS. 2A and 2B illustrate remote controllers according to the invention. A computer system 200 shown in FIG. 1 has a keyboard 100 and a monitor 120, can be driven by activating a power switch 210 of a computer 201, and can be remotely driven by a remote controller 300.

Figure 7:
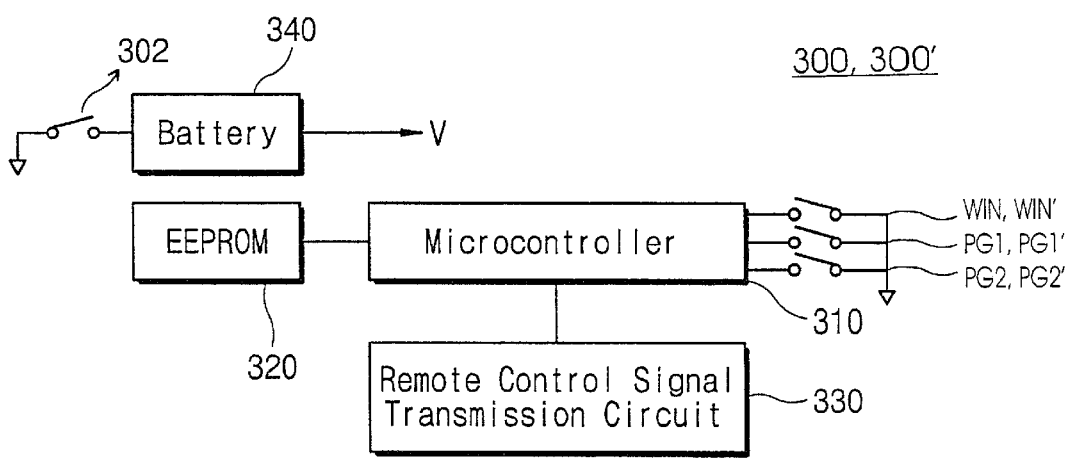
FIG. 7 is a diagram illustrating a structure of a remote controller shown in FIG. 3 according to the present invention.

As shown in FIGS. 2A and 2B, a remote controller 300, 300' includes an on/off switch 302, 302' mounted on one side of the remote controller 300, 300' and a plurality of command selection keys, such as a windows selection key WIN, WIN', a first program selection key PG1, PG1, and a second program selection key PG2, PG2', that are mounted on an upper side of the remote controller 300, 300'. The on/off switch 302, 302' is used to power on/off the remote controller 300, 300' operated by a battery 340 (FIG. 7). The command keys WIN, WIN', PG1, PG1', and PG2, PG2' are used to generate remote control signals for remote control of the computer system. The windows selection key WIN, WIN' is used to generate a command executing a log on operation of the windows. Here, windows is a product supporting a graphic user interface (GUI), such as Microsoft Windows 95 or Windows 98, for example. The first and the second program selection keys PG1, PG1' and PG2, PG2' are used to generate a command automatically executing the appointed first and second programs as well as a log on of an operating system of the computer system 200.

The first, second and third command keys correspond to the WIN, PG1 and PG2 of controller 300 of FIG. 2A, respectively. Similarly, the first, second and third command keys correspond to the WIN', PG1' and PG2' of controller 300' of FIG. 2B, respectively. The operations performed in the remote controller 300' of FIG. 2B typically are the same as the operations performed in the remote controller 300 of FIG. 2A. The remote controllers 300 and 300' desirably have the same structure, although they can differ in external appearance. The first command key corresponds to the window selection key WIN, WIN', the second command key corresponds to the first program selection key PG1, PG1', and the third command key corresponds to the second program selection key PG2, PG2'.

Figure 3:
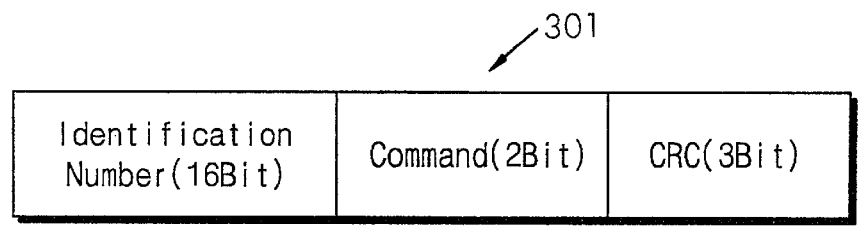
FIG. 3 is a diagram illustrating a shape or configuration of a remote control signal generated by a remote controller according to the present invention.

FIG. 3 is a diagram showing the shape or configuration of a remote control signal generated by a remote controller 300, 300' according to the present invention. In FIG. 3, a remote control signal 301 from a remote controller 300, 300' includes an identification number stored in the remote controller 300, 300' and a command for controlling a computer system 200. That is, the remote control command can use 16 bits for an identification number, 2 bits for transmitting a computer system 200 control command to a key code, and 3 bits for cyclic redundancy check (CRC) data. A value of the key code is allotted to each of the command keys WIN, WIN', PG1, PG1' and PG2, PG2' provided to the remote controller 300, 300'.

Figure 4:
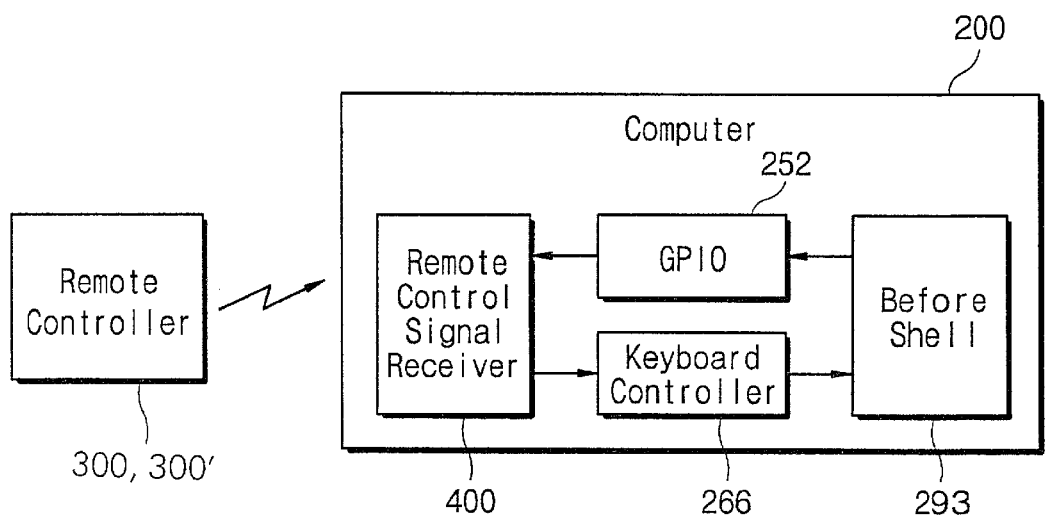
FIG. 4 is a block diagram briefly illustrating a remote controller and a computer system shown in FIG. 1 according to the present invention.

FIG. 4 is a block diagram illustrating a remote controller 300, 300' and a computer system 200 having the same shown in FIG. 1. Referring now to FIG. 4, as well as to FIG. 5, a remote control signal generated from a remote controller 300, 300' is transmitted to a remote control signal receiver 400 mounted in a computer system 200, controlling operation of the computer system 200. The remote control signal receiver 400 is coupled to a general purpose input output (GPIO) 252 of the computer system 200 and a keyboard controller 266 of a super input/output (super I/O) 265. Super I/O 265 is an integrated input/output I/O controller. Recently, a super I/O controller can support plural IDE hard drives, and plural floppy drives, plural standard Com ports, for example. The general purpose input output (GPIO) 252 and the keyboard controller 266 are coupled to a before shell 293 which is a program means.

The before shell 293 is composed of a virtual keyboard driver 290, an auto log shell 291, and a launcher shell program 292. The remote control signal transmitted from the remote control signal receiver 400 is executed by the virtual keyboard driver 290 and the launcher shell program 292. The launcher shell program 292 transmits the state information of the computer system 200 to a general purpose input output (GPIO) 252 included in a PCI-to-ISA bridge 250. That is, if the remote control signal from the remote controller 300 is transmitted to the remote control signal receiver 400, a key code of the command included in the remote control signal is supplied to the keyboard controller 266. At this time, a microcontroller 410 included in the remote control signal receiver 400 records information for remote control in a specific region of the basic input/output system (BIOS) 260. If booting is performed by means of the remote controller 300, 300', the auto log shell 291 can automatically input thereto a user identification (ID) and a password requisite for the log on of the windows without passing through a complementary metal oxide semiconductor (CMOS) password check, along a booting routine stored in the BIOS 260. The virtual keyboard driver 290 of the before shell 293 analyzes a value of the key code, and then transmits a control command for automatic execution of a program to the launcher shell program 292. The launcher shell program 292 responds to the command from the virtual keyboard driver 290, and then automatically executes a program assigned by selecting a command button of the remote controller 300, 300'.

As described above, the before shell 293 including a before shell program, as a program execution means or program performing means, receives a remote control signal from the remote control signal receiver 400 through the keyboard controller 266 and then executes it, and transmits power state information of the computer system 200 to the remote control signal receiver 400 through the general purpose input output (GPIO) 252.

The described operation of the before shell 293 can be performed when the identification number of the remote controller 300, 300' is identical to that of the remote control signal receiver 400. When the identification numbers are identical to each other, the remote controller 300, 300' can perform remote control of the computer system 200 through the before shell 293. The identification number of the present invention is composed so that the identification number of the remote controller 300, 300' can be set to the remote control signal receiver 400. This is a function designed to perform remote control of a computer system 200 by means of a new remote controller, such as remote controller 300', when a user loses the remote controller 300. A method of setting the identification number and setting steps will be described more fully as follows.

Figure 5:
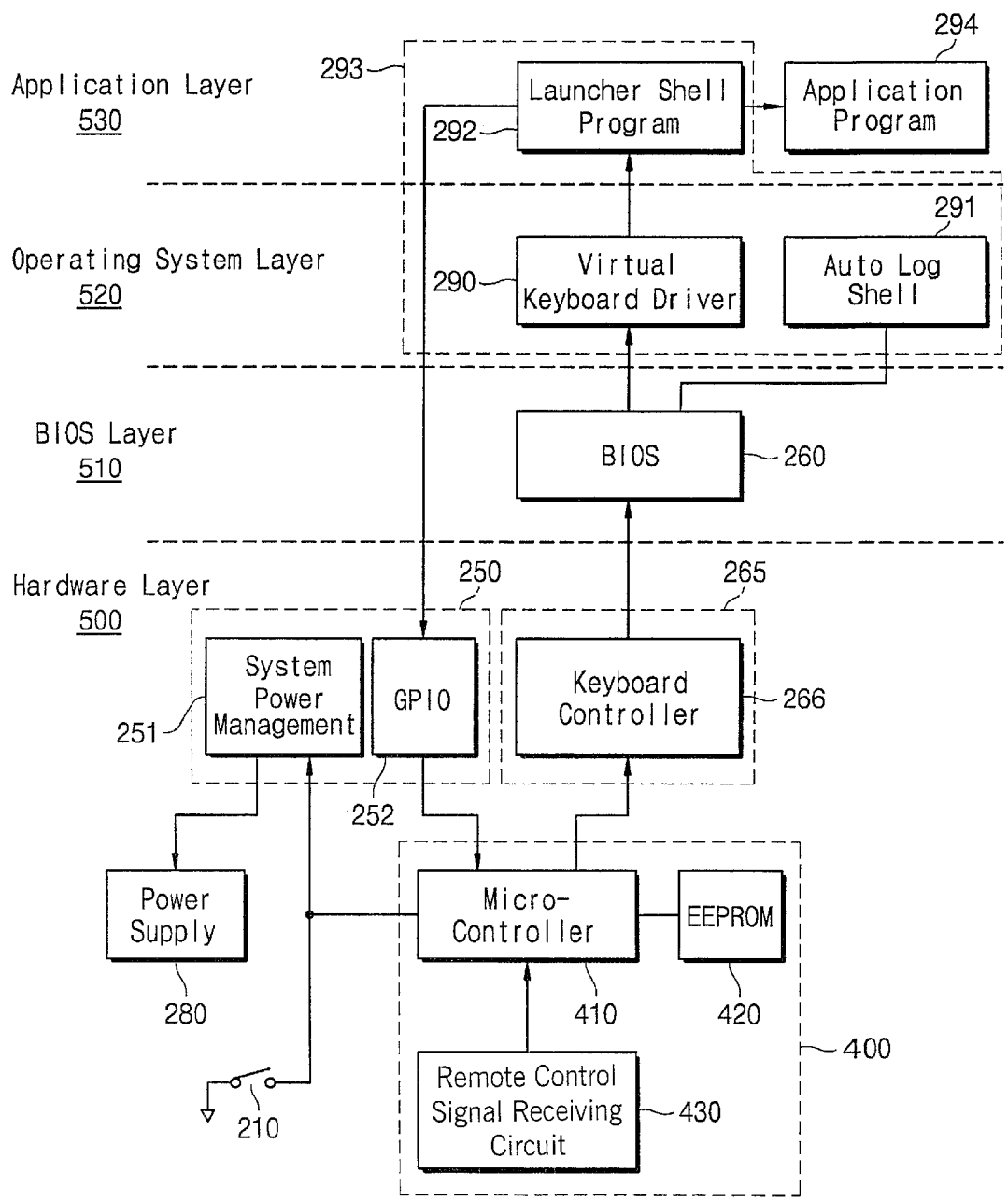
FIG. 5 is a hierarchical view illustrating a structure of a computer system having a remote control signal receiver shown in FIG. 4 according to the present invention.

FIG. 5 is a hierarchical view showing a structure of a computer system 200 having a remote control signal receiver shown in FIG. 4. Referring now to FIG. 5, a computer system 200 has a hierarchical structure including a hardware layer 500, a BIOS layer 510, an operating system layer 520, and an application layer 530. As parts related to remote control according to the present invention, the hardware layer 500 includes a PCI-to-ISA bridge 250, a super I/O 265, and a remote control signal receiver 400. The PCI-to-ISA bridge 250 includes a system power management 251 and a GPIO 252. PCI-to-ISA bridge 250 is, for example, a well known "PCI-to-ISA bridge controller". An example of a PCI-to-ISA bridge controller is disclosed in Platform Components Databook, by Intel Corporation, January 1998, pp. 221–496. Generally, a general purpose input output (GPIO), such as general purpose input output (GPIO) 252, is included in the PCI-to-ISA bridge controller, such as PCI-to-ISA bridge 250. A power supply 280 and a power switch 210 are coupled to the system power management 251.

The PCI-to-ISA bridge 250 and the super I/O 265 are coupled to a microcontroller 410 for transmitting a state signal of a computer system 200 to the microcontroller 410. In particular, a remote control signal from the microcontroller 410 is transmitted to a keyboard controller 266 included in the super I/O 265, and then controls operation of the computer system 200. The BIOS layer 510 includes a BIOS (basic input/output system) 260. The operating system layer 520 includes a virtual keyboard driver 290 and an auto log shell 291 which is a means for automatic log on of the operating system. The application layer 530 includes a launcher shell program 292, which is a means for automatic execution of a program, and other application programs 294. The group including the virtual keyboard driver 290, the auto log shell 291, and the launcher shell program 292 is referred to as a before shell 293.

The before shell 293 executes a command based upon a remote control signal transmitted from the microcontroller 410 of the remote control signal receiver 400 through the virtual keyboard driver 290 and the launcher shell program 292. The launcher shell program 292 transmits state information of the computer system to the GPIO 252 included in the PCI-to-ISA bridge 250. That is, when the remote control signal from the remote controller 300 is transmitted to the remote control signal receiver 400, a key code of a command included in the remote control signal is supplied to the keyboard controller 266. At this time, the microcontroller 410 records information of the remote control in a specific region of the BIOS 260. When booting is performed by the remote controller 300, 300' in accordance with a booting routine stored in the BIOS 260, the auto log shell 291 automatically inputs a user identification number and a password to the windows. The virtual keyboard driver 290 of the before shell 293 analyzes the value of the key code and then transmits a control command for automatic execution of a program to the launcher shell program 292. The launcher shell program 292 responds to the control command from the virtual keyboard driver 290, and then automatically executes a program appointed by selecting a command key of the remote controller 300, 300'.

Figure 6:
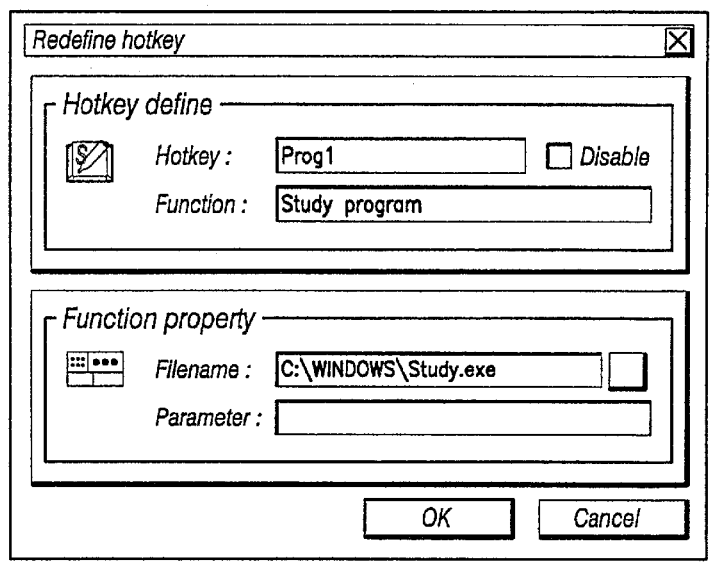
FIG. 6 is a diagram illustrating a window of a before shell program for redefining programs appointed by the second or the third command keys of the remote controller according to the present invention.

FIG. 6 is a diagram illustrating a window of a before shell program for redefining programs appointed by the second or the third command keys of the remote controller 300, 300' according to the present invention. The before shell 293 resides in the computer and is displayed with the shape of a tray icon, as illustrated in FIG. 6. Therefore, a user can always call the before shell program of before shell 293. The before shell 293 is provided so that a user can optionally alter a first program and a second program selected by the first program and the second program selection keys PG1, PG1' and PG2, PG2' shown in FIGS. 2A and 2B. As shown in FIG. 6, the first and the second programs corresponding to the first and the second command keys can be changed by executing the before shell program of before shell 293. Further, the before shell 293 has a function of setting an identification number of the remote controller 300, 300' to the remote control signal receiver 400. The setting function is provided to allow remote control of the computer system 200 to be performed. Even if the remote controller 300 being used is lost, a new remote controller, such as remote controller 300', can perform remote control of the computer system 200 due to the setting function.

FIG. 7 is a diagram illustrating the structure of a remote controller 300, 300' shown in FIGS. 2A and 2B. Referring now to FIG. 7, a remote controller 300, 300' includes an EEPROM 320 for storing an identification number, a microcontroller 310 for generating a computer remote control signal including the identification number of the remote controller 300, 300' and a command input from one of the command keys WIN, WIN', PG1, PG1', and PG2, PG2', a remote control signal transmission circuit 330 for transmitting the remote control signal to the remote control signal receiver 400, and a battery 340 for providing operational power for the remote controller 300, 300' by operation of switch 302. Particularly, the microcontroller 310 controls a series of operations to generate a remote control signal coupled between the EEPROM 320 and the remote control signal transmission circuit 330, and then to transmit the remote control signal through the transmission circuit 330. The microcontroller 310 of the present invention is a single chip microcontroller and uses a "KS57C0504N," by SAMSUNG ELECTRONICS CORPORATION (SEC), for example. In transmission of the remote control signal, the remote control signal transmission circuit 330 can use one of an infrared signal and a radio frequency (RF) signal. The methods and apparatus of the present invention desirably use the infrared signal. The EEPROM 320 desirably uses, for example, a KS24C010 EEPROM by SAMSUNG ELECTRONICS CORPORATION (SEC) having a storage capacity of 1-Kbit (128-byte) and a standard I²C bus interface, for example. The maximum kinds or variations of the identification number stored in the EEPROM 320 can be 248, which can optionally be stored by a manufacturing company in advance when the remote controller 300, 300' is manufactured or can be created at random when the remote controller 300, 300' is driven for the first time. The identification number is stored in the remote control signal receiver 400, enabling the identification number of the remote controller 300, 300' to be identical to that of the remote control signal receiver 400. Although an EEPROM (electrically erasable and programmable ROM) is used so as to store the identification number, the memory device can also be composed of an erasable and programmable ROM (EPROM) or read only memory (ROM), for example.

Figure 8:
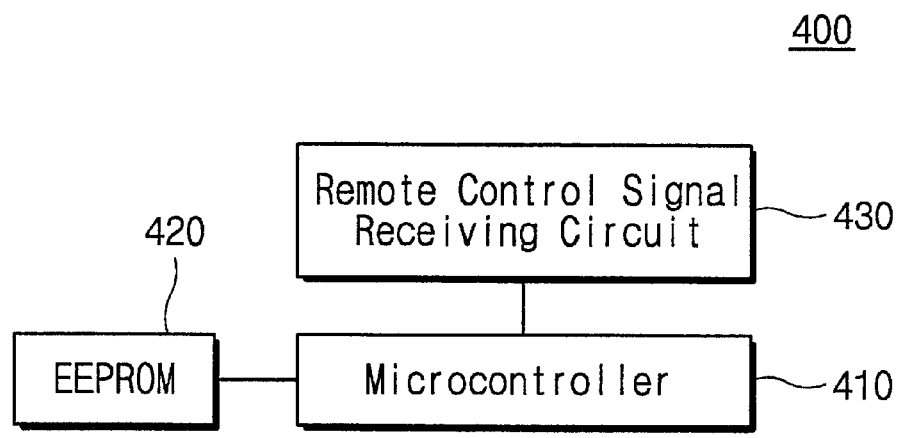
FIG. 8 is a diagram illustrating a structure of a remote control signal receiver shown in FIG. 3 according to the present invention.

FIG. 8 is a diagram illustrating the structure of a remote control signal receiver 400 shown in FIG. 4. Referring now to FIG. 8, remote control signal receiver 400 includes an EEPROM 420, a remote control signal receiving circuit 430, and a microcontroller 410. The same identification number as that of a remote controller 300, 300' is stored in the EEPROM 420. The remote control signal receiving circuit 430 receives a remote control signal from the remote controller 300, 300'. The microcontroller 410 determines whether the identification number of the remote controller 300, 300' is identical to that of the EEPROM 420. If the identification numbers are identical to each other, the command stored in the remote control signal will be performed. The remote control signal. receiving circuit 430 corresponds to the remote control signal transmission circuit 330 of the remote controller 300, 300'. Although the remote control signal receiving circuit 430 receives one of an infrared signal and a radio frequency (RF) signal, the infrared signal is desirably applied. The microcontroller 410 and the EEPROM 420 use the same model as the microcontroller 310 and the EEPROM 320, respectively, shown in FIG. 7, for example.

Figure 9:
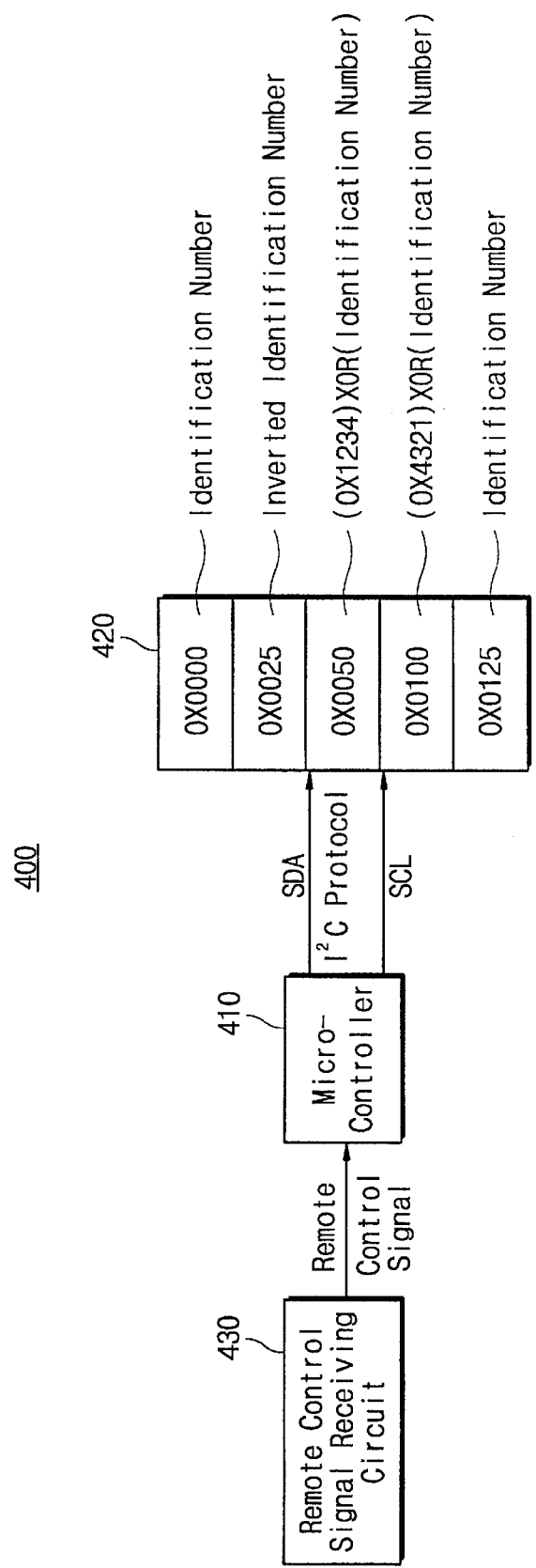
FIG. 9 is a diagram illustrating the steps of encoding and decoding an identification number of an EEPROM shown in FIG. 8 according to the present invention.
Figure 10:
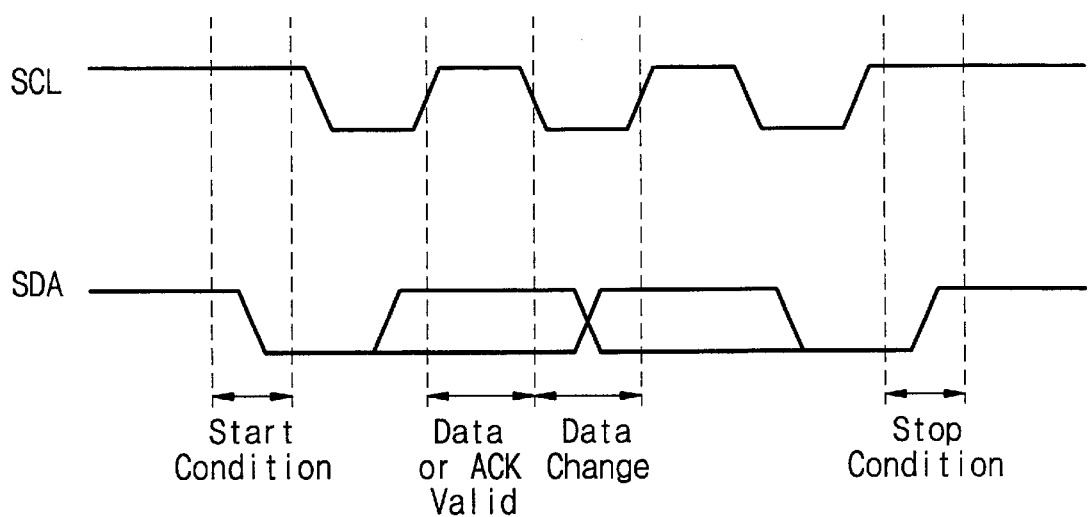
FIG. 10 is a diagram illustrating data transmission timing for encoding and decoding an identification number of an EEPROM shown in FIG. 9 according to the present invention.

FIG. 9 is a diagram showing steps of encoding and decoding an identification number of an EEPROM, such as EEPROM 420, shown in FIG. 8, and FIG. 10 is a diagram showing data transmission timing for encoding and decoding an identification number of an EEPROM, such as EEPROM 420, illustrated in FIG. 9.

Referring to FIG. 9, the identification number from the remote controller 300 is stored in several regions (for example, five regions) of the EEPROM 420 of the remote control signal receiver 400. The identification number is stored in the respective regions after inverting and XOR operations with a specific number, such as "0X1234" or "0X4321", for example. The identification number can be varied with "different shapes" or configurations, or different identification numbers, to be stored in the EEPROM 420, and the number can be varied by inverting and logical operations such as the XOR operation, for example.

Continuing with reference to FIGS. 9 and 10, initial steps of storing an identification number will be described as follows. When a key of the remote controller 300, 300' is pressed, the remote controller 300, 300' generates a remote control command with such a shape or configuration as shown in FIG. 3. The remote control command includes a command for controlling the identification and the computer system 200 stored in the EEPROM 320 of the remoter controller 300, 300'. The remote control signal is transmitted to the microcontroller 410 of the remote control signal receiver 400 through the remote control signal receiving circuit 430 thereof. The microcontroller 410 separates an identification number from the remote control signal and then stores it in the EEPROM 420 of the remote control signal receiver 400. By means of an I²C protocol, an identification number and a clock signal are transmitted to the EEPROM 420 through a serial data line SDA and a serial clock line SCL.

Referring to FIG. 9, if the remote control signal is transmitted from the remote controller 300, 300', the microcontroller 410 of the remote control signal receiver 400 separates the identification number from the remote control signal, and stores the identification number in several locations (for example, five locations) of the EEPROM 420 by changing the value of the original identification number. As mentioned above, when a user sets a new identification number in the EEPROM 420, the identification number is stored in several regions of the EEPROM 420. However, the stored identification numbers are capable of being stored incorrectly.

For example, in an initial remote control operation, after setting the identification number, if the remote control signal is transmitted from the remote controller 300, 300', the microcontroller 410 separates the identification number from the remote control signal, and compares the identification number with the five identification numbers stored in the EEPROM 420 after inverting and XOR operations. If the identification number from the remote controller 300, 300' is identical to at least three or more identification numbers stored in the EEPROM 420, the microcontroller 410 determines that the identification number from the remote controller 300 is an identification number of an authorized user. In addition, the microcontroller 410 corrects the identification numbers stored in the EEPROM 420.

Continuing with reference to FIGS. 9 and 10, if both the serial data line SDA and the serial clock line SCL are a logic high ("1"), an I²C bus is not enabled. If the serial data line SDA is transitioned into a logic low ("0") from the logic high ("1") while the serial clock line SDA maintains the logic high ("1"), an initial state is established. New data are loaded on the bus while the serial clock line is the logic low ("0"), carrying out the data (identification number) transition. The identification number data are stored in the EEPROM 420 and, particularly, are stored in five places, for example. First, an original identification number is stored in an address 0X0000 and an address 0X0125, respectively, and then is inverted so as to store it in an address 0X0025. Thereafter, an exclusive-OR (XOR) operation of 0X1234 and the identification number is performed so as to store it in an address 0X0050, and the XOR operation of 0X4321 and the identification number is performed so as to store it in an address 0X0100. If the remote control signal is received from the remote controller 300, 300', the microcontroller 410 compares the identification number stored in the remote control signal with the identification numbers stored in the five places. If three or more identification numbers are identical to one another, the microcontroller 410 recognizes the identification number transmitted from the remote controller 300, 300' as an authorized one.

Figure 11:
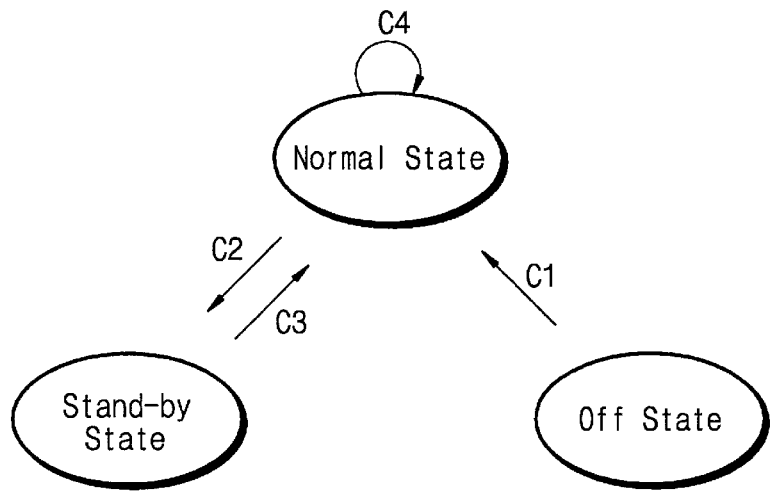
FIG. 11 is a state diagram illustrating transition of a power state of a computer system according to a remote control signal according to the present invention.

FIG. 11 illustrates transition of a power state of a computer system 200 according to a remote control signal. Referring now to FIG. 11, a power state of a computer system 200 is one of a normal state, a stand-by state, and an off state. The control by the remote controller 300, 300' is dependent upon the power state thereof. For example, if the windows selection key WIN, WIN' is selected when the computer system 200 lies in the off state, the computer system 200 is booted and the automatic log on of the windows is carried out. In that case, the power state of the computer system 200 is changed from the off state to the normal state (refer to arrow C1). If the first program selection key PG1, PG1' is selected, the computer system 200 is booted and the automatic log on of the windows is carried out, thereafter executing an assigned first program. Similarly, if the second program selection key PG2, PG2' is selected, the computer system 200 is booted and the automatic log on of the windows is carried out, thereafter executing an assigned second program. In these cases, the power states of the computer system 200 are changed from the off state to the normal state (refer to arrow C1) in the same manner as when the windows selection key WIN, WIN' is selected. In addition, if the window selection key WIN, WIN' is selected when the computer system 200 is in the normal state, the computer system 200 is converted into the stand-by state (refer to arrow C2). If the first program selection key PG1, PG1' is selected, the first program is automatically executed, and the power state of the computer system 200 is kept in the normal state (refer to arrow C4). If the second program selection key PG2, PG2' is selected, the second program is automatically executed, and the power state of the computer system 200 is kept in the normal state (refer to arrow C4). Moreover, if the windows selection key WIN, WIN' is selected when the computer system 200 lies in the stand-by state, the state of the computer system 200 is converted to the normal state (refer to arrow C3). If the first or the second program selection key PG1, PG1' or PG2, PG2' are selected, no operation is carried out. In order to prevent data loss caused by shutdown of the operation when the remote controller mistakenly inputs information, particularly, the computer system and methods of the present invention desirably do not have a turn-off function. The remote control operational steps of the computer system 2000 using such a remote controller 300, 300' will now be described in detail.

Figure 12:
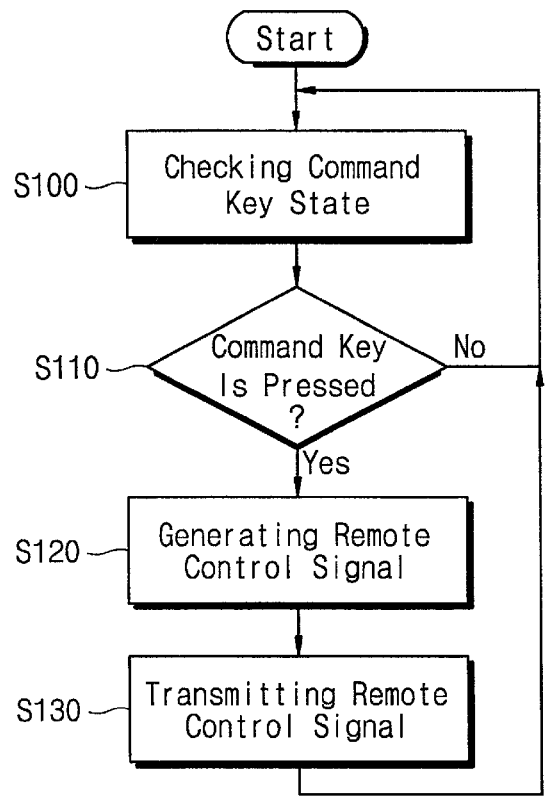
FIG. 12 is a flowchart illustrating the operational steps of a remote controller shown in FIG. 7 according to the present invention.

FIG. 12 is a flowchart illustrating the operational steps of a remote controller 300, 300' shown in FIG. 7. Referring now to FIG. 12, in step S100, the microcontroller 310 in the remote controller 300, 300' checks the states of the command keys WIN, WIN', PG1, PG1' and PG2, PG2'. Then, in step S110, the microcontroller 300, 300' determines whether the command keys WIN, WIN', PG1, PG1' and PG2, PG2' are pressed. If one of the command keys WIN, P1, PG1' and PG2, PG2' is pressed, then in step S120 a remote control signal is generated, including generation of a command key code by selecting an identification number stored in the EEPROM 320. Then, in step S130, the remote control signal is transmitted to the remote control signal receiver 400 by means of a transmission circuit 330. The process then returns back to step S100, and the microcontroller 310 checks the states of the command keys WIN, WIN', PG1, PG1' and PG2, PG2'.

In a computer system including a computer 200 and a remote controller 300, 300', an identification number is stored in an EEPROM 320 of the remote controller 300, 300'. The identification number is stored at the time of manufacturing, or the identification number is generated automatically in the remote controller 300, 300' as a random number when a user operates the remote controller 300, 300' for the first time. According to the above described method, the remote controller 300, 300' can include the identification number. However, a remote control signal receiver 400 included in the computer 200 does not include an identification number at the time of manufacturing. Thus, it is required to store the identification number in an EEPROM 420 of the remote control signal receiver 400. The identification number storing method for the EEPROM 420 of the remote control signal receiver 400 is illustrated in FIG. 13.

Figure 13:
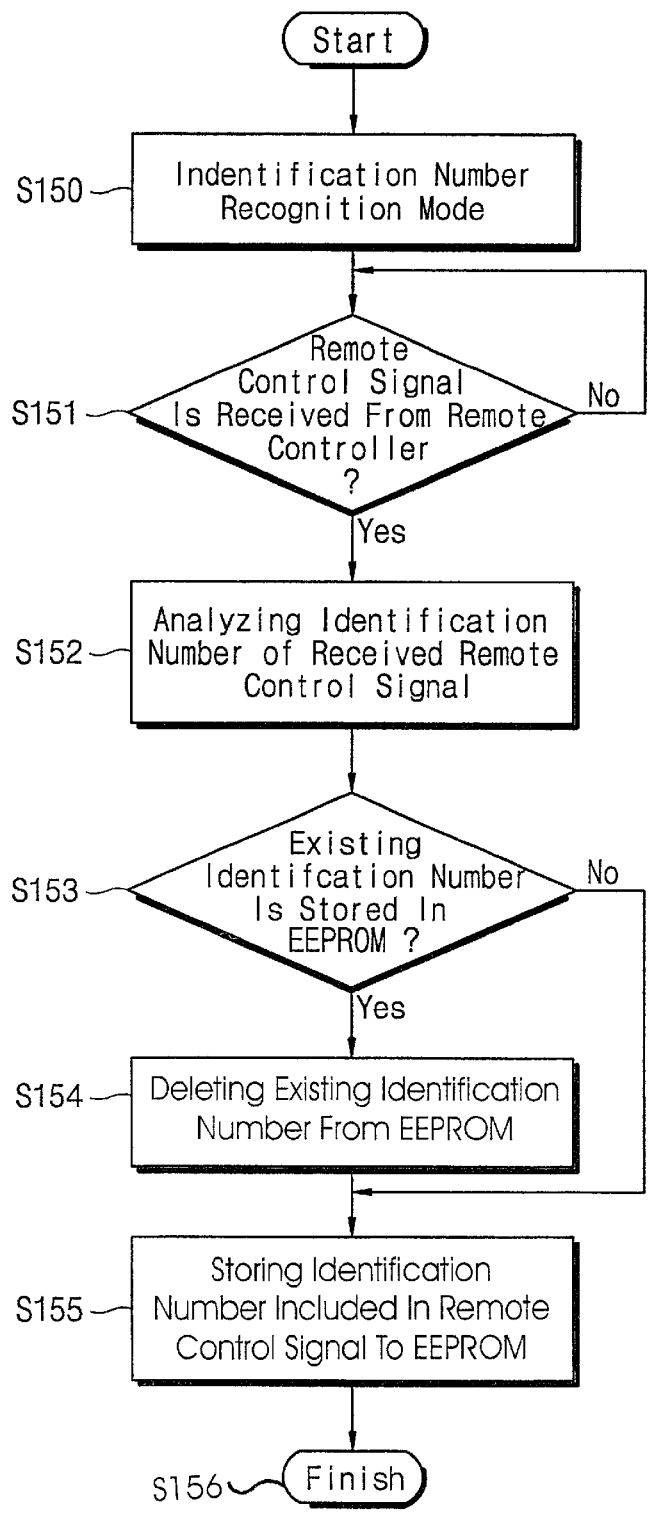
FIG. 13 is a flowchart illustrating the recognition steps of an identification number of a remote control signal receiver shown in FIG. 8 according to the present invention.

FIG. 13 is a flowchart showing the setting steps of an identification number of a remote control signal receiver 400 shown in FIG. 8. At initial use of the computer system 200, the identification number is not stored in the EEPROM 420 of the remote control signal receiver 400, but the identification number is stored in the EEPROM 320 of the remote controller 300, 300'. In that case, if a user wants to control the computer system 200 with the remote controller 300, 300', the user must set the identification number from the EEPROM 320 of the remote controller 300, 300' to the EEPROM 420 of the remote control signal receiver 400. After storing the identification number, the user can control the computer system 200 remotely by means of the remote controller 300, 300'.

In addition, when the user loses the remote controller 300, 300' after setting the identification number, the user cannot control the computer system 200 remotely. In that case, the user can take a new remote controller storing an identification number (a new identification number). The new identification number of the new remote controller typically is not the same as the identification number of the EEPROM 420 of the remote control signal receiver 400 (an old identification number). In that case, it is required to update the old identification number to the new identification number so as to perform the remote control. For updating the identification number, the computer system 200 typically must be turned on manually by the user. Since the user is the authorized user, the computer system can be operated over the security function, such as using the CMOS password check.

According to the above described reasons, the identification number can exist or not in the EEPROM 420. If the identification number of the EEPROM 420 does not exist, it is a first setup operation of the identification number and, if the identification number exists in the EEPROM 420, it is not a first setup operation of the identification number.

As mentioned above, the remote controller 300, 300' has a function of transmitting the identification number of the remote controller 300, 300' to the remote control signal receiver 400. The identification number of the remote controller 300, 300' can be stored in the EEPROM 420 included in the remote control signal receiver 400 under control of the microcontroller 410 during first use of the computer system 200 or at a time when the remote controller 300, 300' is lost. The function makes it possible to perform remote control of computer system 200 by means of the remote controller 300, 300'. If the used remote controller, such as remote controller 300, is lost, the function also makes it possible to perform remote control of the computer system 200 by means of a new remote controller, such as remote controller 300'.

Referring now to FIG. 13, in step S150, the identification number of the remote controller 300, 300' enters an identification recognition mode provided in the before shell 293 so as to set it to the remote control signal receiver 400. Then, in step S151, the microcontroller 410 determines whether a remote control signal is received from the remote controller 300, 300'. If the remote control signal is not received, the remote control operation is not carried out. If the remote control signal is received, the microcontroller 410 separates the only identification number from the received remote control signal, and then analyzes it in step S152. In step S152, the microcontroller 410 also separates the identification number from the remote control signal when the remote control signal is received so as to store the identification number from the remote controller 300, 300' in the EEPROM 420 of the remote control signal receiver 400. Then, in step S 153, the microcontroller 410 determines whether there is an existing identification number in the EEPROM 420 of the remote control signal receiver 400. If the step is an initial identification number setting step for performing remote control of the computer system 200, an existing identification number may not be stored in EEPROM 420. If the computer system 200 has already undergone the remote control by means of the remote controller 300, 300', the existing identification number may be stored in EEPROM 420. If the existing identification number is stored in EEPROM 420, the existing identification number is then deleted in step S154. Then, in step S155, the identification number included in the remote control signal is stored therein, and then the method is finished at step S156.

If the identification number is not stored in EEPROM 420, then this is the initial identification number recognition step. The process then proceeds from step S153 to step S155 for storing the identification number included in the remote control signal in the EEPROM 420 and then finishing the method at step S156. The identification number of the remote controller 300, 300' is stored in the remote control signal receiver 400 which does, for the sake of a security function, perform an appointed remote control signal function when two identification numbers stored in two places are confirmed to be identical to each other. Further, when the remote controller, such as remote controller 300, is lost, a user can set a new identification number by means of a new remote controller, such as new remote controller 300', making it possible to perform remote control of the computer system 200 with the use of the new identification number. A manufacturer or a manufacturing corporation of the computer system 200 and the remote controller 300, 300' manages the identification number of the computer system 200 and the remote controller 300, 300'. If the user loses the remote controller 300, 300', the user obtains the new remote controller from an authorized supply center of the manufacturer. The authorized supply center of the manufacturer stores the changed identification number of the remote controller 300, 300'. The manufacturer manages the identification number by forming a database. Thus, if the computer system is stolen, the authorized user can be verified by the identification number information of the database.

Figure 14:
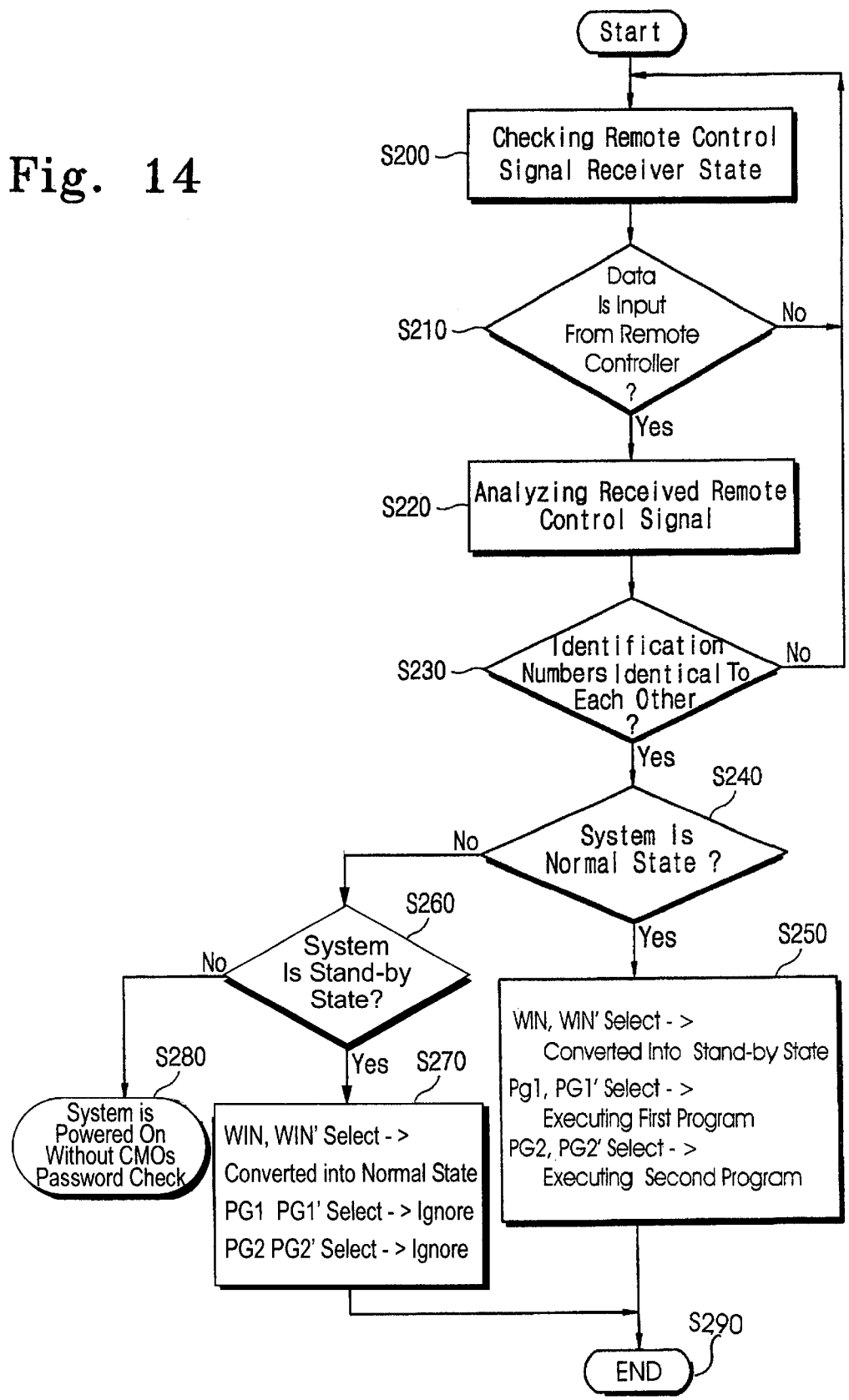
FIG. 14 is a flowchart illustrating the operational steps of a remote control signal receiver shown in FIG. 8 according to the present invention.

FIG. 14 is a flowchart illustrating the operational steps of a remote control signal receiver 400 shown in FIG. 8. Referring now to FIG. 14, in step S200, microcontroller 410 checks a state, such as a signal receiving state or signal not receiving state, of a remote control signal receiver 400. Then, in step S210, the microcontroller 410 determines whether a remote control signal is transmitted from a remote controller 300, 300'. If the remote control signal is not inputted, step S210 then returns to step S200 to check the state thereof. If the remote control signal is input, the remote control signal received from the remote controller 300, 300' is then analyzed in step S220. After separation of the identification number included in the remote control signal, then, in step S230, the microcontroller 410 determines whether the identification number is identical to an identification number stored in the remote control signal receiver 400. In the EEPROM 420 of the remote control signal receiver 400, identification numbers are stored in five places, for example. If the identification number from the remote controller 300, 300' is not identical to at least three or more identification numbers stored in the five places, step S230 then returns to step S200 to check the state of the remote control signal receiver 400. If the identification number from the remote controller 300, 300' is identical to at least three or more identification numbers stored therein, step S230 then proceeds to step S240 to check whether the power state of the computer system 200 is a normal state. At this time, if this is an initial remote control operation after setting an identification number, the microcontroller 410 of the remote control signal receiver 400 changes other identification numbers, which correspond to incorrect identification numbers in the EEPROM 420, and which are not identical to the identification number from the remote controller 300, 300', so as to be identical to the identification number of the remote controller 300, 300' and then stores them. When confirmation of the identification number is finished, a control command from the remote controller 300, 300' is executed according to the power state of the computer system 200.

If the power state of computer system 200 is a normal state, then step S240 proceeds to step S250 to perform a remote control operation by means of the command code included in the remote control signal. At this time, if a windows selection key WIN, WIN' is selected, the microcontroller 410 converts the power state of the computer system 200 to a stand-by state. If the first program selection key PG1, PG1' is selected, an appointed first program is performed. Similarly, if the second program selection key PG2, PG2' is selected, an appointed second program is performed. The process then ends at step S290. If the power state thereof is not the normal state, step S240 proceeds to step S260. Then, in step S260, the microcontroller 410 determines whether the power state there of is the stand-by state. If the power state there of is not the stand-by state at step S260, the microcontroller 410 powers on the system in step S280 because it is in an off state and, in step S280, the system is powered on without a CMOS password check. If it is a stand-by state, step S260 then proceeds to step S270 to perform the remote control operation by means of the key code included in the remote control signal in a manner similar to step S250. At this time, if the windows selection key WIN, WIN' is selected, the power state of the computer system is converted into the normal state. If the first or the second program selection key PG1, PG1' or PG2, PG2' is selected, input of the selection key PG1, PG1' or PG2, PG2' is ignored so as not to carry out any corresponding operation. The process then ends at step S290.

Therefore, in summary and with reference to FIG. 14, the microcontroller 410 of the remote control signal receiver 400 determines the power state of the computer 200 in steps S240 and S260. Then, the microcontroller 410 executes the remote control command included in the remote control signal from the remote controller 300, 300' in steps S250, S270 and S280.

As mentioned above, an identification number the same as an identification number stored in the remote controller 300, 300' is stored in the EEPROM 420 of the remote control signal receiver 400. If a user loses the remote controller, such as remote controller 300, a new identification number is stored in the remote control signal receiver 400 with the use of a new remote controller, such as remote controller 300', carrying out remote control of the computer system 200. A manufacturing corporation can manage information of the identification numbers of the remote controller 300, 300' with a database. As a result, information relating to an authorized user using the computer system 200 can be accurately managed to prevent robbery of the computer system. For preventing robbery of the computer system, for example, a manufacturer or a manufacturing corporation of the computer system 200 manages the identification number of the computer system 200 and the remote controller 300, 300'. If the computer system 200 is stolen, the authorized user can be verified by using the identification number information of the database.

According to the present invention, it is possible to perform remote control of a computer system having a security function with the use of a remote controller. An automatic log on function of an operating system of a computer system and a batch function related to an appointed program can be carried out by remote control. Further, an identification number the same as an identification number of a remote controller for the security function can be stored in a remote control signal receiver of the computer system. Further, database management of the identification numbers leads to a determination whether a user is authorized, managing history of the computer system and preventing a robbery of the computer system.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A computer system, comprising:
    a computer;
    a remote controller for storing an identification number of said remote controller, and for generating a remote control signal including said identification number of said remote controller and a command code for remote control of said computer system;
    a remote control signal receiver connected to said computer and receiving said remote control signal from said remote controller, said remote control signal receiver storing a reference identification number; and
    program performing means for performing an automatic log on of an operating system of said computer, and for automatically performing an appointed program according to said remote control signal of said remote controller, when said identification number of said remote controller is identical to said reference identification number stored by said remote control signal receivers;
    said remote controller including a first command key and a second command key;
    wherein said remote controller is responsive to user operation of said first command key for transmitting a first command to said remote control signal receiver, in response to which said program performing means performs said automatic log on of said operating system; and
    wherein said remote controller is responsive to user operation of said second command key for transmitting a second command to said remote control signal receiver, in response to which said program performing means automatically executes a program corresponding to said second command after said automatic log on of said operating system.

2. The computer system of claim 1, said remote controller further including:
    a first memory for storing said identification number of said remote controller;
    a first microcontroller for generating said remote control signal comprising said command code, said command code corresponding to a selected one of said first command key and said second command key;
    a remote control signal transmission circuit using one of an infrared signal and a radio frequency signal in order to transmit said remote control signal to said remote control signal receiver of said computer system; and
    a power supply for supplying operational power for said remote controller.

3. The computer system of claim 2, said identification number of said remote controller being one of a number created to be stored in said remote controller at a time of manufacturing of said remote controller and a number created at random to be stored in said remote controller.

4. The computer system of claim 2, said remote control signal receiver including:
    a second memory for storing said reference identification number stored by said remote control signal receiver;
    a remote control signal receiving circuit for receiving said remote control signal from said remote controller by using one of infrared signal reception and radio frequency signal reception; and
    a second microcontroller for receiving said remote control signal from said remote controller and a power state signal of said computer, and for determining whether said identification number of said remote controller included in said received remote control signal is identical to said reference identification number stored in said second memory, said second microcontroller inputting said command code to said program performing means when said identification number of said remote controller included in said remote control signal from said remote controller is identical to said reference identification number stored in said second memory.

5. The computer system of claim 4, wherein a power state of said computer system is one of a system off state, a normal state, and a stand-by state.

6. The computer system of claim 5, wherein a function corresponding to said remote control signal is executed according to said power state of said computer system, said remote control signal not having a power turn-off function, whereby to prevent data loss caused by a shutdown of an operation of said computer when said remote controller mistakenly inputs information.

7. The computer system of claim 6, wherein a complementary metal oxide semiconductor password check is skipped when said computer is powered on when said reference identification number of said remote controller is identical to said identification number stored in said second memory and when said computer system is booted by means of said remote controller.

8. The computer system of claim 1, said program performing means including:
   a virtual keyboard driver for confirming whether said command code transmitted from said remote controller to said remote control signal receiver is received, and then generating a control command;
   means for responding to said control command, and then automatically executing the appointed program; and
   means for performing said automatic log on of said operating system of said computer by automatically inputting a user identification number and a password to said operating system of said computer when said computer system is booted by means of said remote controller and when said identification number of said remote controller is the same as said reference identification number stored by said remote control signal receiver.

9. The computer system of claim 8, said program performing means residing in said computer and being displayed with a shape of a tray icon, and said program performing means storing, in said remote control signal receiver, said identification number of said remote controller included in said remote control signal; and
   said program corresponding to said control command being variable.

10. The computer system of claim 1, further comprising comparing means for comparing said identification number of said remote controller with said reference identification number stored by said remote control signal receiver.

11. The computer system of claim 10, wherein said comparing means provides a control signal to said program performing means when said identification number of said remote controller matches said reference identification number stored by said remote control signal receiver.

12. The computer system of claim 1, wherein said remote controller includes a third command key, and is responsive to user operation of said third command key for transmitting a third command to said remote control receiver, in response to which said program performing means automatically executes a program corresponding to said third command after said automatic log on of said operating system.

13. The computer system of claim 12, said program performing means including:
   a virtual keyboard driver for confirming whether said command code transmitted from said remote controller to said remote control signal receiver is received, and then generating a control command;
   means for responding to said control command, and then automatically executing a program; and
   means for performing said automatic log on of said operating system of said computer by automatically inputting a user identification number and a password to said operating system of said computer when said computer system is booted by means of said remote controller and when said identification number of said remote controller is the same as said reference identification number stored by said remote control signal receiver.

14. The computer system of claim 13, said program performing means residing in said computer and being displayed with a shape of a tray icon, and said program performing means storing said identification number of said remote controller included in said remote control signal in said remote control signal receiver.

15. A method of storing an identification number of a remote controller, stored in a memory of said remote controller, in a memory of a remote control signal receiver in a computer system, comprising the steps of:
   executing an identification number recognition mode in said computer system;
   determining whether a remote control signal is received from said remote controller;
   analyzing said identification number of said remote controller included in said remote control signal when said remote control signal is received from said remote controller;
   determining whether an existing identification number is stored in said memory of said remote control signal receiver; and
   deleting said existing identification number from said memory of said remote control signal receiver when said existing identification number is stored in said memory of said remote control signal receiver, and then storing said identification number of said remote controller in said memory of said remote control signal receiver, and, alternatively, storing said identification number of said remote controller in said memory of said remote control signal receiver when said existing identification number is not stored in said memory of said remote control signal receiver.

16. The method of claim 15, said identification number of said remote controller being one of a number created to be stored in said remote controller when said remote controller is manufactured and a number created at random to be stored in said remote controller.

17. The method of claim 16, said identification number of said remote controller being varied to have different configurations to be stored in respective addresses of said memory of said remote control signal receiver.

18. The method of claim 15, said identification number of said remote controller being varied to have different configurations to be stored in respective addresses of said memory of said remote control signal receiver.

19. A method for remote control of a computer system in response to a remote control signal from a remote controller, comprising the steps of:

checking a signal receiving state of a remote control signal receiver of said computer system, and then determining whether said remote control signal is received from said remote controller;

determining whether an identification number of said remote controller included in said received remote control signal is identical to an identification number stored in said remote control signal receiver when said remote control signal is received from said remote controller; and performing a function corresponding to said received remote control signal when said identification number of said remote controller included in said received remote control signal is identical to said identification number stored in said remote control signal receiver;

wherein said remote control signal alternatively includes a first command generated by a first command key of said remote controller and a second command generated by a second command key of said remote controller; and wherein said performing step comprises performing an automatic log on of an operating system of said computer system when said first command is generated, and performing a program corresponding to said second command after automatic log on of said operating system of said computer when said second command is generated.

20. The method of claim 19, said function corresponding to said received remote control signal being performed according to a power state of said computer system, and said remote control signal not having a power turn-off function, whereby to prevent data loss caused by a shutdown of an operation of said computer system when said remote controller mistakenly inputs information.

21. A computer system, comprising:

a computer;

a remote controller for storing an identification number of said remote controller, and for generating a remote control signal including said identification number of said remote controller and a command code for remote control of said computer system;

a remote control signal receiver connected to said computer and receiving said remote control signal from said remote controller, said remote control signal receiver storing a reference identification number; and program performing means for performing an automatic log on of an operating system of said computer, and for automatically performing an appointed program according to said remote control signal of said remote controller, when said identification number of said remote controller is identical to said reference identification number stored by said remote control signal receiver;

wherein a power state of said computer system is one of a system off state, a normal state, and a stand-by state; and wherein a function corresponding to said remote control signal is executed according to said power state of said computer system, said remote control signal not having a power turn-off function, whereby to prevent data loss caused by a shutdown of an operation of said computer when said remote controller mistakenly inputs information.

22. The computer system of claim 21, wherein a complementary metal oxide semiconductor password check is skipped when said computer is powered on when said reference identification number of said remote controller is identical to said identification number stored in said second memory and when said computer system is booted by means of said remote controller.

23. A method for remote control of a computer system in response to a remote control signal from a remote controller, comprising the steps of:

checking a signal receiving state of a remote control signal receiver of said computer system, and then determining whether said remote control signal is received from said remote controller;

determining whether an identification number of said remote controller included in said received remote control signal is identical to an identification number stored in said remote control signal receiver when said remote control signal is received from said remote controller; and performing a function corresponding to said received remote control signal according to a power state of said computer system when said identification number of said remote controller included in said received remote control signal is identical to said identification number stored in said remote control signal receiver, said power state of said computer system being one of a system off state, a normal state, and a stand-by state;

said function corresponding to said remote control signal being performed according to said power state of said computer system, and said remote control signal not having a power turn-off function, whereby to prevent data loss caused by a shutdown of an operation of said computer system when said remote controller mistakenly inputs information.

24. The computer of system of claim 23, said remote control signal including:

a first command generated by a first command key of said remote controller in order to perform an automatic log on of an operating system of said computer system;

a second command generated by a second command key of said remote controller in order to perform said automatic log on and to automatically execute a first program; and a third command generated by a third command key of said remote controller in order to perform said automatic log on and to automatically execute a second program.

* * * * *